May 21, 1968          L. M. FORBUSH          3,384,885
MULTIPLE LIQUID RESERVOIR LIQUID LEVEL INDICATOR
Filed Feb. 21, 1966
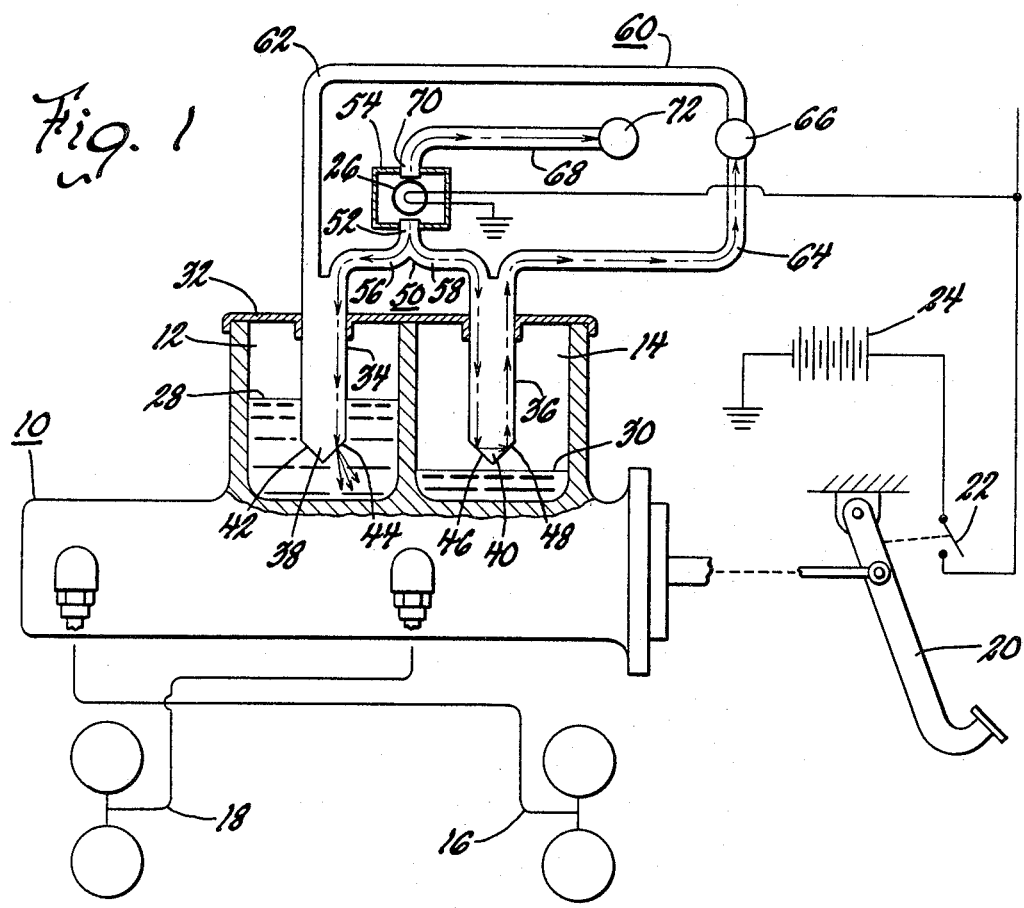
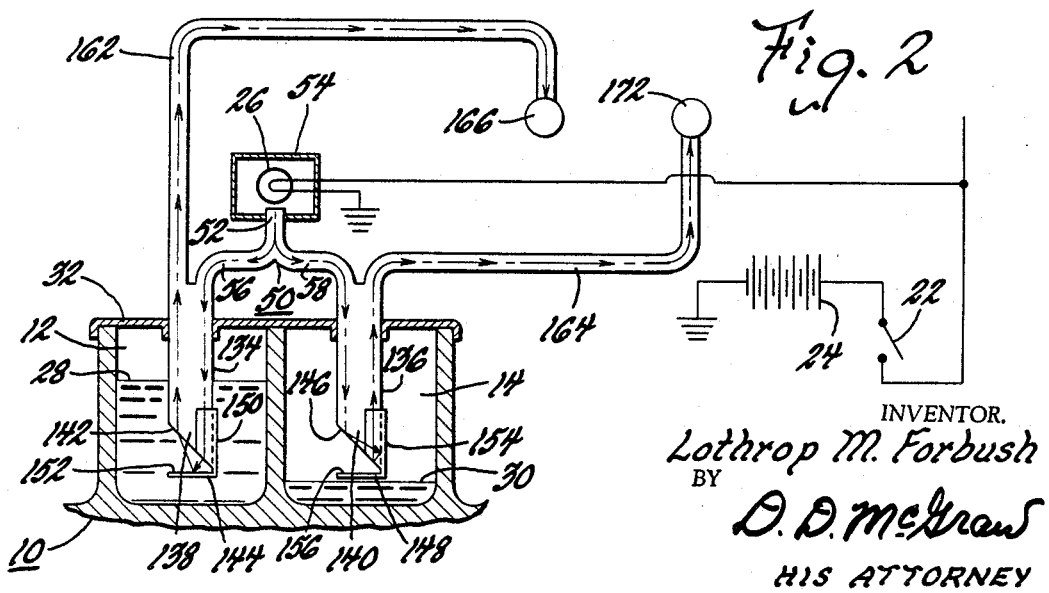
INVENTOR.
Lothrop M. Forbush
BY
D. D. McGraw
HIS ATTORNEY United States Patent Office 3,384,885
Patented May 21, 1968

3,384,885
MULTIPLE LIQUID RESERVOIR LIQUID
LEVEL INDICATOR
Lothrop M. Forbush, Birmingham, Mich., assignor to General Motors Corporation, Detroit, Mich., a corporation of Delaware
Filed Feb. 21, 1966, Ser. No. 529,118
5 Claims. (Cl. 340—244)

ABSTRACT OF THE DISCLOSURE

A liquid level indicator system for separate liquid reservoirs in which a light-transmitting probe is inserted in each reservoir, and light from a selectively energizable light source is transmitted through a branch of an optical fiber circuit to each probe and is refracted into the liquid in the associated reservoir if the liquid level is sufficiently high. If the liquid level in any reservoir is sufficiently low, the light is reflected back through the probe in that reservoir and into another branch of the optical fiber circuit to visual indicator means. Appropriate light reflectors may be utilized to transmit a colored light when the light is reflected and to cause another color of light to be reflected back into the probe when the light is refracted into the liquid.

The invention relates to means for indicating the liquid level condition in a plurality of liquid reservoirs, and more particularly relates to an indicating system utilized with a multiple reservoir vehicle brake master cylinder assembly. In one embodiment of the invention a display light or indicator is utilized to check operation of the indicator lamp and another display light or indicator is utilized to indicate the fact that one or more of the reservoirs has an adverse liquid level. In another modification a display light or indicator is provided for each reservoir and each light indicates normal as well as adverse liquid level conditions for each reservoir. The invention utilizes fiber optics, and particularly the behavior of certain types of light transmitting materials when a portion of such material is surrounded by liquid or by air so that the reflection or transmittal of light is affected. Such a material is exemplified by an acrylic resin sold under the trademark Lucite by E. I. du Pont de Nemours, or a methyl methacrylate resin sold under the trademark Plexiglas by Rohm and Haas. Such a material is used because of its physical property which is the ability to receive, transmit and confine within its body visible light which is passed therethrough. It is well known that materials having light transmitting properties, such as Lucite and Plexiglas, have the ability to contain light therein when transmitted therethrough when the material is in a medium having a density such as air. Such materials also have the ability to transmit the light into the medium in which it is disposed rather than contain the light therein when the material is disposed in a medium of density similar to its own. Such media include, for example, water, oil, and hydraulic brake fluid. Furthermore, the light is transmitted through the material in an axial manner when the material is formed as a fiber or rod, and much of the light will be emitted to air when it reaches an end which is normal to the axial light flow path, so that the presence of light in the material at such an end can be readily detected.

Systems embodying the invention may utilize different colored reflectors so that the display light will reflect one color for normal liquid level conditions and a different colored light for adverse liquid level conditions. When such an indicating system is utilized with a vehicle multiple reservoir brake master cylinder assembly, the normal liquid level is higher than the adverse liquid level. In some other applications for such liquid level indicators, the reverse may be true.

In the drawing:

FIGURE 1 is a schematic representation, with parts broken away and in section, of a liquid level indicator system for separate liquid reservoirs.

FIGURE 2 is a schematic representation of a modification of the liquid level indicator system of FIGURE 1, having parts broken away and in section.

The liquid level indicator systems are illustrated as being utilized with a vehicle brake master cylinder assembly 10 having separate brake fluid liquid reservoirs 12 and 14 in the illustrated embodiments. Reservoir 12 serves the rear brake system 16 and reservoir 14 serves the front brake system 18. The master cylinder assembly 10 is suitably actuated by the vehicle operator by depression of the brake pedal 20. The usual brake actuated stop lamp switch 22 is provided in an electrical circuit including a source of electrical energy schematically illustrated as battery 24. A source of light for the fluid level indicator system is provided as lamp 26, which is in series in the brake stop lamp circuit with the brake switch 22.

The liquid reservoirs 12 and 14 are illustrated with reservoir 12 having a normal liquid level and reservoir 14 having an adverse liquid level. In vehicle brake systems, a normal liquid level is a high fluid level indicated by the fluid level height line 28 and an adverse fluid level is a low fluid level indicated by the fluid level height line 30. The reservoirs are provided with a suitable top cover 32, each provided with a generally centrally located opening through which probes or rods 34 and 36 respectively extend. The probes are of similar construction, having beveled lower ends 38 and 40. The end 38 of probe 34 is therefore provided with flat face surfaces 42 and 44 and the end 40 of probe 36 is provided with flat face surfaces 46 and 48. The other ends of probes 34 and 36 extend outwardly above top cover 32. The probes are part of an optical fiber circuit. The circuit has an input branch 50 having one end 52 exposed to the light source 26, which is preferably contained in a housing 54. The branch 50 has two optical fiber sections 56 and 58. The other end of branch section 56 is connected with the upper end of probe 34, and the other end of branch section 58 is connected with the upper end of probe 36. The arrangement is such that light from the light source 26 passes into branch 50 through end 52 and is transmitted through the branch sections 56 and 58 into the probe upper ends and through the probes. Each probe has its upper end also connected with a second branch 60 of the optical fiber circuit with optical fiber sections 62 and 64 being respectively connected to the upper ends of probes 34 and 36 adjacent branch sections 56 and 58 and substantially parallel thereto. Branch sections 62 and 64 terminate in a common indicator 66, which may be constructed similar to the end 52 of branch 50. In this instance, however, the indicator 66 is a light emission end. It is preferably covered by a suitable colored lens, with a red lens being most desirable since the transmission of light through the indicator end 66 indicates an adverse condition. The system embodying the invention may also have another optical fiber section 68 having a light receiving end 70 exposed to light source 26 and a light emission or indicating end 72, which is preferably covered by a colored lens, the preferable color being green since in this instance emission of light through the indicator indicates the fact that the light source 26 is operating. Of course, the light source 26 is energized only when the brake switch 22 is closed by depression of the brake pedal 20, so that indicator end 72 emits light only when the vehicle brake is being actuated.

Light passing through branch sections 56 and 58 and downwardly through the probes 34 and 36 passes faces 44 and 48 and is dispersed in the liquid when the liquid level covers the faces and therefore is sufficiently high to require no warning. However, as more particularly indicated by the light arrows passing through probe 36, when the liquid level is below the beveled faces, the light from branch section 58, for example, is reflected by face surface 46 within the probe to face surface 48, where it is further reflected within the probe to the branch section 64. The light thus passes only within the probe and to the indicator end 66. Thus when the brakes are energized and the liquid level is low, as illustrated in reservoir 14, the lamp 26 will be energized, the indicator end 72 will indicate that the lamp is operative and the indicator 66 will indicate that there is an adverse liquid level condition in one or both of the reservoirs. If both liquid levels are normal, the light reflected into both probes is dispersed in the liquid and insufficient light is transmitted through the optical fiber branch 60 to cause the indicator end 66 to emit a warning light.

The construction of the modified system shown in FIGURE 2 is generally similar, and is illustrated as being associated with the same brake system as that shown in FIGURE 1. Probes or rods 134 and 136 respectively extend into reservoirs 12 and 14. The two probes are of similar construction, having beveled lower ends 138 and 140. In this instance single beveled flat face surfaces 142 and 146 are respectively provided on the probe ends 138 and 140. Reflectors 144 and 148 are respectively attached to the probe ends 138 and 140. Each reflector has different colored reflecting sections 150, 152, 154 and 156. The preferable different colors are red and green. The red reflector section 150, 154 of each reflector is preferably that portion which extends around the side of the associated probe immediately adjacent the lower end thereof, and the green reflector section 152, 156 of each reflector extends in a plane normal to the axis of the associated probe and spaced slightly below the respective face surfaces 142 and 146. In a system wherein a low liquid level is the normal level and a high liquid level is the adverse level, the colors would be reversed.

The optical fiber circuit of which the probes 134 and 136 are a part has the same input branch 50 with end 52 exposed to the light source 26. Optical fiber sections 56 and 58 are connected to the upper ends of the probes in the same manner as these sections are connected to the probes in FIGURE 1. Each probe also has its upper end connected with fiber sections leading to indicators visually available to vehicle operators or other persons interested in the liquid level conditions. Optical fiber section 162 is therefore connected to the upper end of probe 134 and optical fiber section 164 is connected to the upper end of probe 136. These connections are likewise respectively adjacent to the connections of branch sections 56 and 58 and substantially parallel thereto. Branch section 162 terminates in an indicator 166 which is the indicator for the liquid level in reservoir 12. When utilized in the vehicle brake system shown, this indicator is for the rear brake circuit liquid level. A similar indicator 172 is provided at the end of optical fiber section 164. In the brake system shown this indicator is for the front brake circuit system liquid level. In this modification the indicators are not colored or provided with a colored lens cover.

White light from lamp 26 passing through branch sections 56 and 58 and downwardly through probes 134 and 136 passes through face surfaces 142 and 146 and enters the liquid when the liquid level covers the faces. An example of this condition is illustrated with regard to reservoir 12 and probe 134. The white light entering the liquid is not given an opportunity to disperse, but is refracted at the face surface 142 so that it strikes the green reflector section 152 of the reflector 144 and is reflected to the face surface 142, where it is again refracted. Thus the green light from the reflector section 152 again passes through the liquid and back into the probe and through the optical fiber section 162. The green light is emitted from the end of optical fiber section 162, causing the indicator 166 to indicate a satisfactory liquid level condition for the reservoir 12.

The adverse low liquid level condition is illustrated with regard to reservoir 14. In this instance the white light passing through branch section 58 passes downwardly through probe 136 and, since the probe is surrounded by air, the light is reflected from face surface 146 so that it remains within the probe. It is again reflected by the red reflector section 154 or reflector 148 so that only red light is further transmitted. The red light is again directed to another portion of face surface 146 and is again reflected within the probe so that it passes through the optical fiber section 164. The red light will therefore be emitted at indicator 172, indicating an adverse liquid level condition existing in the reservoir 14. It is noted that in this condition the light remains within the probe, while in the condtion described with regard to reservoir 12 the light passes out of the probe, into the liquid, and is reflected back into the probe to provide the proper indication. It is, therefore, clear that each probe and reflector will operate to indicate by means of either a red or green light the liquid level condition of the respective reservoir.

When the system is utilized to indicate a normal or satisfactory liquid level condition being below the probe end and an adverse or undesirable liquid level condition being above the probe end, the red and green reflector surfaces are reversed in each instance. Then, the light is contained within the probe and results in a green indication when the liquid level is satisfactorily low, but will result in a red indication when the liquid level is adversely high.

Since light source 26 is in series with the brake stop light switch 22, the light will be on only when the brakes are applied. Therefore, when the brakes are applied the vehicle operator will normally have green light indicators available indicating a satisfactory liquid level condition in each reservoir. However, when he applies the vehicle brake with a low liquid level condition in either or both reservoirs, the indicator associated with such reservoir or reservoirs will show red light, immediately bringing the operator's attention to the fact so that appropriate action can be taken without delay.

What is claimed is:
1. A liquid level indicator system for separate brake fluid reservoirs in first and second fluidly independent vehicle brake fluid systems, said indicator system comprising:
  a selectively energizable light source;
  a vehicle brake stop light circuit having said light source therein and energizing said light source when the vehicle brakes are applied;
  an optical fiber circuit having a first branch one end of which is exposed to said light source;
  a probe for each reservoir, each probe having one end bevel faced and extending into the associated reservoir and the other end connected with said first branch and receiving light through said first branch from said source when said source is energized;
  a second optical fiber circuit branch for each probe, each second branch having one end connected with said associated probe other end to receive light from said associated probe and the other end terminating in visual indicator means;
  and means including each of said probe bevel faced ends respectively directing light received by each of said probes from said first branch into liquid in the associated reservoir when the associated reservoir liquid level is above said bevel faced end,
  and directing light received by each of said probes from said first branch to said associated second branch within said associated probe when the liquid level in the associated reservoir is below said bevel faced end.

2. The liquid level indicator system of claim 1, each of said second branch other ends terminating in a common visual indicator.

3. The liquid level indicator system of claim 1, said optical fiber circuit further comprising a third branch having one end receiving light from said light source and the other end having an indicator utilizing light so received and indicating energization of the light source.

4. The liquid level indicator system of claim 1, said light directing means further including
 a first colored reflector on each probe adjacent the probe bevel faced end thereof and reflecting light of that color when the light is directed within the associated probe and to the associated second branch,
 and a second differently colored reflector secured to each probe adjacent but spaced from the probe bevel faced end thereof and aligned to reflect the light directed into the liquid when the liquid level is above the bevel faced end back into the probe and to the associated second branch whereby the visual indicator means indicates the liquid level by color.

5. A liquid level indicator system for separate reservoirs of liquid, said indicator system comprising:
 a selectively energizable light source;
 an optical fiber circuit having a first branch one end of which is exposed to said light source;
 a probe for each reservoir, each probe having one end bevel faced and extending into the associated reservoir and the other end connected with said first branch and receiving light through said first branch from said source when said source is energized;
 a second optical fiber circuit branch for each probe, each second branch having one end connected with said associated probe other end to receive light from said associated probe and the other end terminating in visual indicator means;
 means including each of said probe bevel faced ends respectively directing light received by each of said probes from said first branch into liquid in the associated reservoir when the associated reservoir liquid level is above said bevel faced end,
 and directing light received by each of said probes from said first branch to said associated second branch within said associated probe when the liquid level in the associated reservoir is below said bevel faced end;
 said light directing means further including
 a first colored reflector on each probe adjacent the probe bevel faced end thereof and reflecting light of that color when the light is directed within the associated probe and to the associated second branch,
 and a second differently colored reflector secured to each probe adjacent but spaced from the probe bevel faced end thereof and aligned to reflect the light directed into the liquid when the liquid level is above the bevel faced end back into the probe and to the associated second branch whereby the visual indicator means indicates the liquid level by color.

References Cited

UNITED STATES PATENTS

| | | | |
|---|---|---|---|
| 2,333,492 | 11/1943 | Ridge. | |
| 2,932,820 | 4/1960 | Boomer et al. | 340—380 |
| 3,054,291 | 9/1962 | Landwer. | |
| 3,120,125 | 2/1964 | Vasel | 88—14 XR |
| 3,141,094 | 7/1964 | Strickler | 250—227 XR |
| 3,188,418 | 6/1965 | Pino | 340—69 XR |

FOREIGN PATENTS 859,104   1/1961   Great Britain.

JOHN W. CALDWELL, *Primary Examiner.*

D. M. MYER, *Assistant Examiner.*